US009005007B2

(12) United States Patent
Shai-Hee

(10) Patent No.: US 9,005,007 B2
(45) **Date of Patent: *Apr. 14, 2015**

(54) METHOD OF GAMING, A GAMING SYSTEM AND A GAME CONTROLLER

(71) Applicant: Aristocrat Technologies Australia Pty Limited, North Ryde (AU)

(72) Inventor: Michael Allan Shai-Hee, Kingsgrove (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/057,944

(22) Filed: Oct. 18, 2013

(65) Prior Publication Data

US 2014/0045576 A1 Feb. 13, 2014

Related U.S. Application Data

(63) Continuation of application No. 13/523,330, filed on Jun. 14, 2012, now Pat. No. 8,585,486, which is a continuation of application No. 12/366,419, filed on Feb. 5, 2009, now Pat. No. 8,221,216.

(30) Foreign Application Priority Data

Feb. 5, 2008 (AU) ................................ 2008900516

(51) Int. Cl.

*A63F 9/24* (2006.01)
*A63F 13/00* (2014.01)
*G07F 17/34* (2006.01)
*G07F 17/32* (2006.01)

(52) U.S. Cl.

CPC ............ *G07F 17/34* (2013.01); *G07F 17/3211* (2013.01)

(58) Field of Classification Search

None

See application file for complete search history.

(56) References Cited

U.S. PATENT DOCUMENTS

| | | | |
|---|---|---|---|
| 5,584,764 | A | 12/1996 | Inoue |
| 2003/0003979 | A1 | 1/2003 | Seelig et al. |

(Continued)

FOREIGN PATENT DOCUMENTS

| | | |
|---|---|---|
| AU | 2004210566 | 9/2005 |
| CA | 2113705 | 7/1995 |

(Continued)

OTHER PUBLICATIONS

United States Patent and Trademark Office, "Notice of Allowance," issued in connection with U.S. Appl. No. 12/366,419, mailed on Mar. 14, 2012, 25 pages.

(Continued)

*Primary Examiner* — Steven J Hylinski

(74) *Attorney, Agent, or Firm* — Hanley, Flight and Zimmerman, LLC

(57) ABSTRACT

A method of gaming including: selecting in each game round a plurality of symbols for display to a player in a set of display positions arranged in a plurality of rows and columns, subsets of the display positions corresponding to respective ones of a plurality of reels, each reel comprising a plurality symbols; controlling the correspondence of display positions to reels so that at least one game round is a diagonal spin game round in which at least one of the reels is arranged to spin diagonally such that it corresponds to display positions in a plurality of neighboring columns; and determining an outcome for each game round based on the selected symbol.

26 Claims, 9 Drawing Sheets

(56) References Cited

U.S. PATENT DOCUMENTS

| | | | |
|---|---|---|---|
| 2008/0064477 A1 | 3/2008 | Fong et al. |
| 2008/0090636 A1 | 4/2008 | Lathrop |
| 2009/0163265 A1 | 6/2009 | Amaitis et al. |
| 2009/0227342 A1 | 9/2009 | Shai-Hee |
| 2010/0210339 A1 | 8/2010 | Chamberlain et al. |

FOREIGN PATENT DOCUMENTS

| | | |
|---|---|---|
| CA | 2545652 | 11/2006 |
| DE | 19603631 | 8/1996 |
| GB | 585357 | 2/1947 |
| GB | 1163213 | 9/1969 |
| GB | 1169349 | 11/1969 |
| JP | 1209089 | 8/1989 |
| JP | 5237216 | 9/1993 |
| JP | 5237217 | 9/1993 |
| JP | 6039085 | 2/1994 |
| JP | 2000102643 | 4/2000 |
| JP | 2000167107 | 6/2000 |
| JP | 2002126250 | 5/2001 |
| JP | 2001178868 | 7/2001 |
| JP | 2005168716 | 6/2005 |
| JP | 2006314678 | 11/2006 |

OTHER PUBLICATIONS

United States Patent and Trademark Office, "Non-Final Office Action," issued in connection with U.S. Appl. No. 12/366,419, mailed on Jul. 28, 2011, 21 pages.

United States Patent and Trademark Office, "Non-Final Office Action," issued in connection with U.S. Appl. No. 13/523,330, mailed on Jun. 7, 2013, 8 pages.

United States Patent and Trademark Office, "Notice of Allowance," issued in connection with U.S. Appl. No. 13/523,330, mailed on Jul. 19, 2013, 10 pages.

METHOD OF GAMING, A GAMING SYSTEM AND A GAME CONTROLLER

CROSS-REFERENCE TO RELATED APPLICATIONS

The present application claims the benefit of priority as a continuation to U.S. patent application Ser. No. 13/523,330, filed on Jun. 14, 2012, entitled "A METHOD OF GAMING SYSTEM AND A GAME CONTROLLER," which is a continuation to U.S. Ser. No. 12/366,419, filed on Feb. 5, 2009, entitled "METHOD OF GAMING, A GAMING SYSTEM, AND A GAMING CONTROLLER," which claims the benefit of priority to Australian Provisional Patent Application No. 2008900516, filed on Feb. 5, 2008, entitled "A METHOD OF GAMING, A GAMING SYSTEM AND A GAME CONTROLLER,' each of which is herein incorporated by reference in its entirety.

FIELD

The present invention relates to a method of gaming, a gaming system and a game controller.

BACKGROUND TO THE INVENTION

Gaming systems are known including a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine with selected symbols are displayed in virtual reels on a video display. In each case, the reels spin vertically.

While such systems provide users with enjoyment, there is a need for alternative gaming systems with different spinning reel features offering unusual new effects.

SUMMARY OF THE INVENTION

According to a first aspect of the invention there is provided a method of gaming including:

- selecting in each game round a plurality of symbols for display to a player in a set of display positions arranged in a plurality of rows and columns, subsets of the display positions corresponding to respective ones of a plurality of reels, each reel including a plurality symbols;
- controlling the correspondence of display positions to reels so that at least one game round is a diagonal spin game round in which at least one of the reels is arranged to spin diagonally such that it corresponds to display positions in a plurality of neighbouring columns;
- determining an outcome for each game round based on the selected symbols.

In an embodiment, the method of gaming further includes controlling the correspondence of display positions to reels so that at least one game round is a vertical spin game round in which the reels are arranged to spin vertically such that they correspond to respective ones of the columns.

In an embodiment, at least one diagonal win line including a diagonal portion is not rearranged in a transition from the vertical spin game round to the diagonal spin game round allowing the diagonal win line to pass through multiple display positions corresponding to a diagonal reels.

In an embodiment, at least another one of the vertically spinning reels of the vertical spin game round is arranged into a non-spinning region in the diagonal spin game round.

In an embodiment, the step of controlling in the diagonal spin game round includes shifting a top display position of at least one vertically spinning reel of the vertical spin game round horizontally in one direction and a bottom display position of the at least one vertically spinning reel of the vertical spin game round horizontally in the other direction.

In an embodiment, the vertical spin game round includes at least three vertically spinning reels and the step of controlling in a diagonal spin game round includes rearranging at least three of the vertically spinning reels of the vertical spin game round into linear diagonally spinning reels.

In an embodiment, the at least three of the vertically spinning reels rearranged to diagonally spinning reels in the diagonal spin game round are the three centremost reels of a set of five reels.

In an embodiment, the step of controlling in the diagonal spin game round includes allowing at least one of the vertically spinning reels of the vertical spin round to remain spinning vertically.

In an embodiment, there are fifteen display positions and the method includes arranging two reels into non-linear sets of display positions including a corner display position and two immediately neighbouring display positions which are disposed diagonally relative to one another.

In an embodiment, occurrence of the diagonal spin game round is controlled by a trigger event.

According to a second aspect of the invention there is provided a gaming system including:

- a display for symbols to be displayed in a set of display positions arranged in a plurality of rows and columns to a player;
- a symbol selector for selecting in each game round a plurality of symbols for display, subsets of the display positions corresponding to respective ones of a plurality of reels, each reel including a plurality of symbols;
- a spin direction controller for controlling the correspondence of display positions to reels so that at least one game round is a diagonal spin game round in which at least one of the reels is arranged to spin diagonally such that it corresponds to display positions in a plurality of neighbouring columns; and
- an outcome generator arranged to determine an outcome for each game round based on the selected symbols.

In an embodiment, the spin direction controller further controls the correspondence of display positions to reels so that at least one game round is a vertical spin game round in which the reels are arranged to spin vertically such that they correspond to respective ones of the columns.

In an embodiment, at least one diagonal win line including a diagonal portion is not rearranged in a transition from the vertical spin game round to the diagonal spin game round allowing the diagonal win line to pass through multiple display positions corresponding to a diagonal reels.

In an embodiment, the spin direction controller arranges at least another one of the vertically spinning reels of the vertical spin game round into a non-spinning region in the diagonal spin game round.

In an embodiment, the spin direction controller in the diagonal spin game round shifts a top display position of at least one vertically spinning reel of the vertical spin game round horizontally in one direction and shifts a bottom display position of the at least one vertically spinning reel of the vertical spin game round horizontally in the other direction.

In an embodiment, the vertical spin game round includes at least three vertically spinning reels and the spin direction controller in a diagonal spin game round rearranges at least three of the vertically spinning reels of the vertical spin game round into linear diagonally spinning reels.

In an embodiment, the at least three of the vertically spinning reels rearranged to diagonally spinning reels in the diagonal spin game round are the three centremost reels of a set of five reels.

In an embodiment, the spin direction controller in the diagonal spin game round allows at least one of the vertically spinning reels of the vertical spin round to remain spinning vertically.

In an embodiment, there are fifteen display positions and the spin direction controller arranges two reels into non-linear sets of display positions including a corner display position and two immediately neighbouring display positions which are disposed diagonally relative to one another.

In an embodiment, the spin direction controller conducts the diagonal spin game round on the basis of a trigger event.

According to a third aspect of the invention there is provided a game controller including:

- a symbol selector for selecting in each game round on a gaming system a plurality of symbols for display to a player in a set of display positions arranged in a plurality of rows and columns on a display, subsets of the display positions corresponding to respective ones of a plurality of reels, each reel including a plurality of symbols;
- a spin direction controller for controlling the correspondence of display positions to reels so that at least one game round is a diagonal spin game round in which at least one of the reels is arranged to spin diagonally; and
- an outcome generator arranged to determine an outcome for each game round based on the selected symbols.

In an embodiment, the spin direction controller further controls the correspondence of display positions to reels so that at least one game round is a vertical spin game round in which the reels are arranged to spin vertically such that they correspond to respective ones of the columns.

In an embodiment, at least one diagonal win line including a diagonal portion is not rearranged in a transition from the vertical spin game round to the diagonal spin game round allowing the diagonal win line to pass through multiple display positions corresponding to a diagonal reels.

In an embodiment, the spin direction controller arranges at least another one of the vertically spinning reels of the vertical spin game round into a non-spinning region in the diagonal spin game round.

In an embodiment, the spin direction controller in the diagonal spin game round shifts a top display position of the at least one vertically spinning reel of the vertical spin game round horizontally in one direction and shifts a bottom display position of the at least one vertically spinning reel of the vertical spin game round horizontally in the other direction.

In an embodiment, the vertical spin game round includes at least three vertically spinning reels and the spin direction controller in a diagonal spin game round rearranges at least three of the vertically spinning reels of the vertical spin game round into linear diagonally spinning reels.

In an embodiment, the at least three of the vertically spinning reels rearranged to diagonally spinning reels in the diagonal spin game round are the three centremost reels of a set of five reels.

In an embodiment, the spin direction controller in the diagonal spin game round allows at least one of the vertically spinning reels of the vertical spin round to remain spinning vertically.

In an embodiment, there are fifteen display positions and the spin direction controller arranges two reels into non-linear sets of display positions including a corner display position and two immediately neighbouring display positions which are disposed diagonally relative to one another.

In an embodiment, the spin direction controller initiates the diagonal spin game round on the basis of a trigger event.

According to a fourth aspect of the invention there is provided computer program code when executed by a computer causes the computer to implement any of the embodiments of the method of gaming of the first aspect of the invention.

According to a fifth aspect of the invention there is provided a computer readable medium including the program code of the fourth aspect of the invention.

According to a sixth aspect of the invention there is provided a data signal including the computer program code of the fourth aspect of the invention.

According to a seventh aspect of the invention, the invention extends to transmitting the program code.

Figure 1:
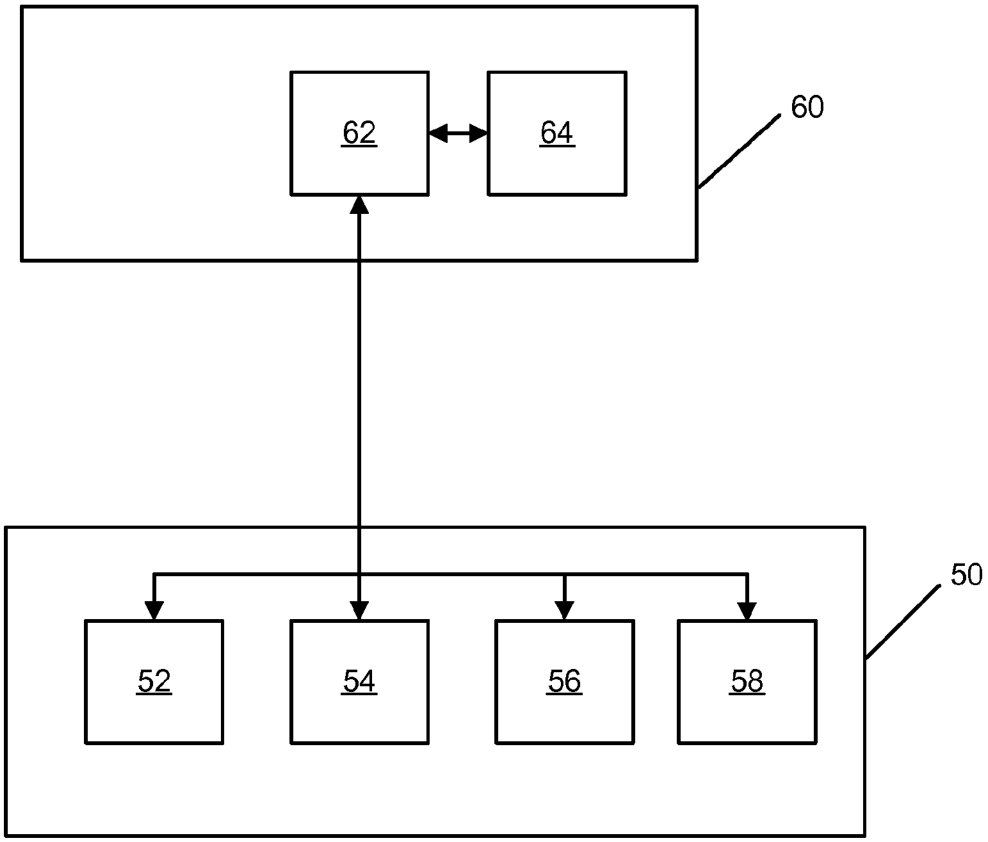
FIG. 1 is a block diagram of the core components of a gaming system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Referring to the drawings, there is shown a gaming system having a game controller arranged to implement a game wherein the spin direction of at least one of the reels can be arranged to a diagonal direction. In some embodiments, both diagonal and vertical spins can occur.

The gaming system may take a number of different forms. In a first form, a stand alone gaming machine is provided wherein all or most components implementing the game are present in a player operable gaming machine.

In a second form, a distributed architecture is provided wherein some of the components implementing the game are present in a player operable gaming machine and some of the components implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game.

Components of the player interface may vary from embodiment to embodiment but will typically include a credit mechanism 52 to enable a player to input credits and receive payouts, one or more displays 54, a game play mechanism 56 that includes one or more input devices which enable a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
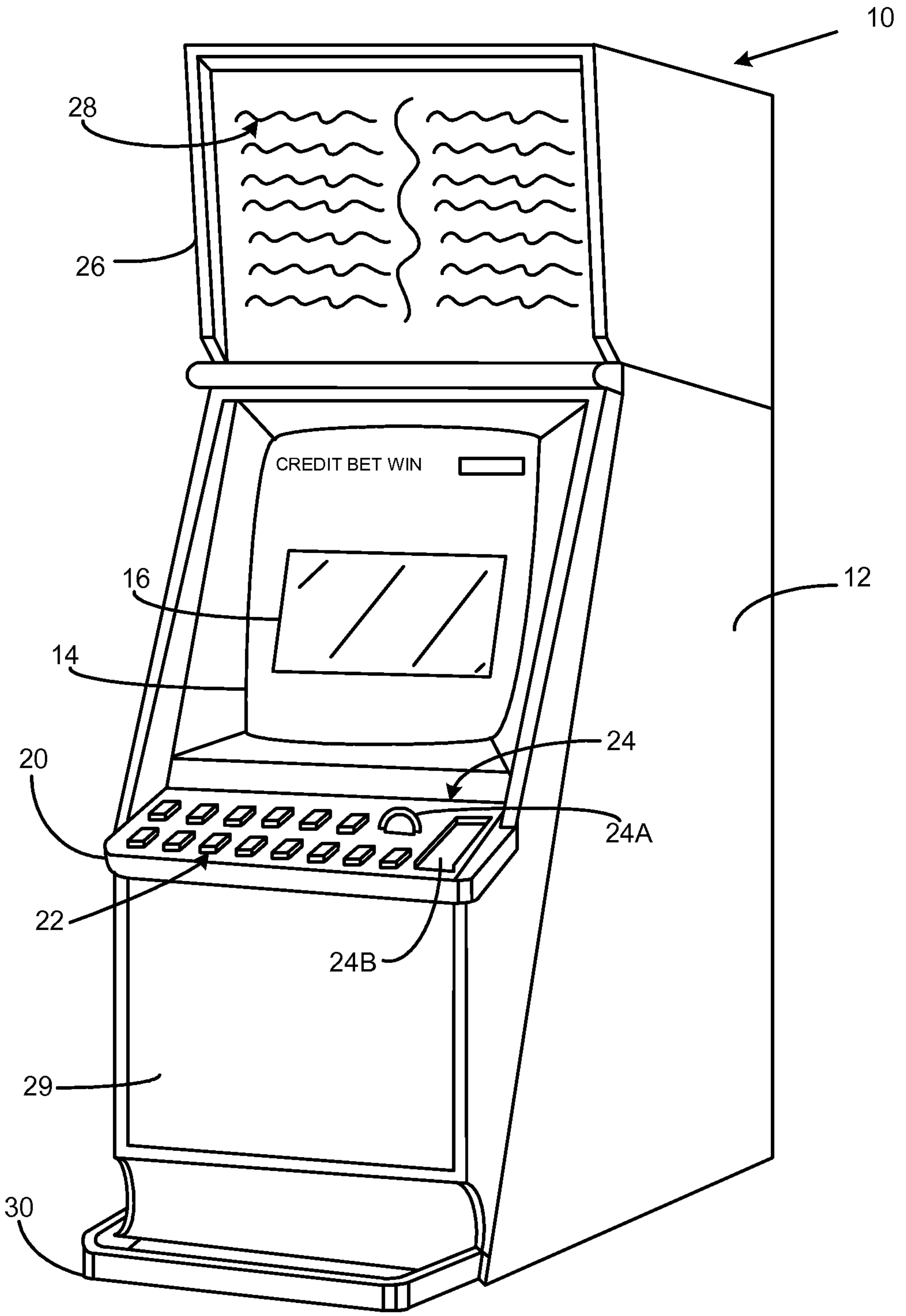
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
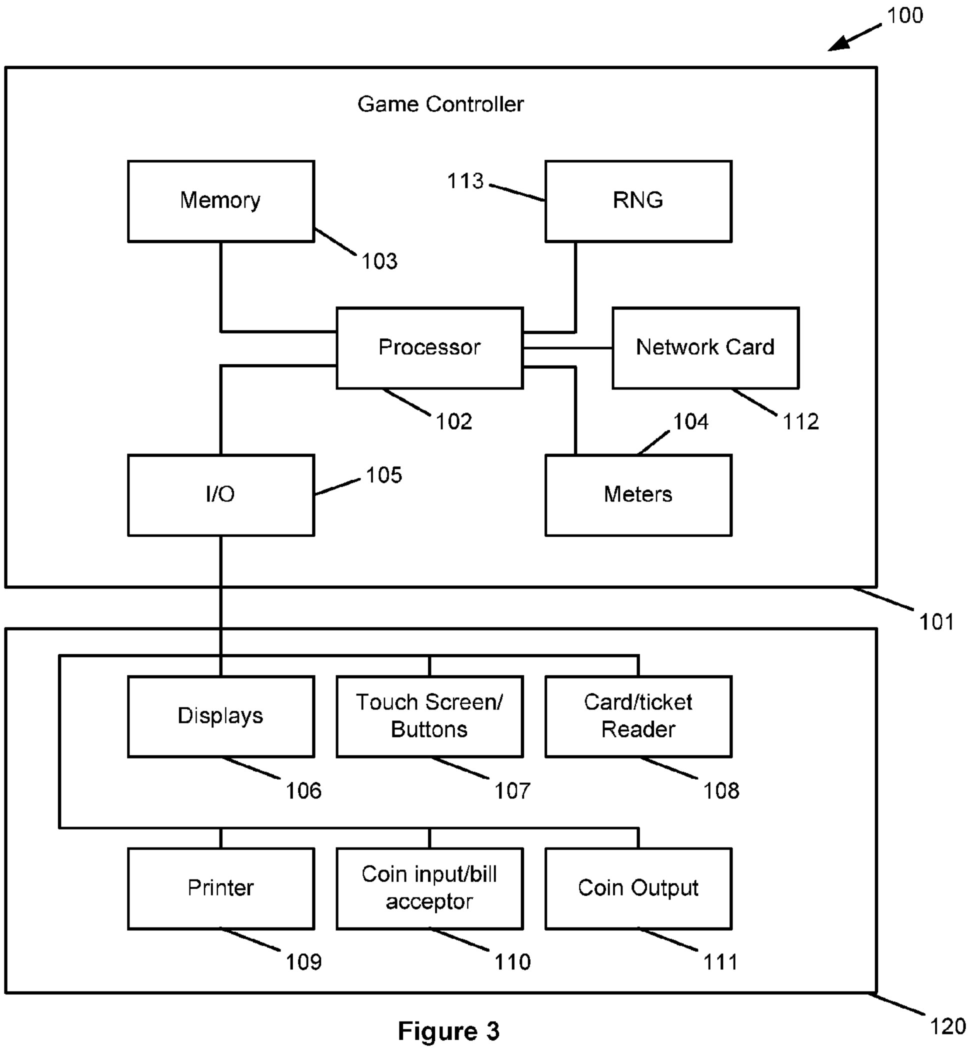
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation. For example, while buttons or touch screens are typically used in gaming machines to allow a player to place a wager and initiate a play of a game any input device that enables the player to input game play instructions may be used.

In addition, the gaming machine 100 may include a communications interface, for example a network card 112. The network card may, for example, send status information, accounting information or other information to a central controller, server or database and receive data or commands from the central controller, server or database.

Figure 4:
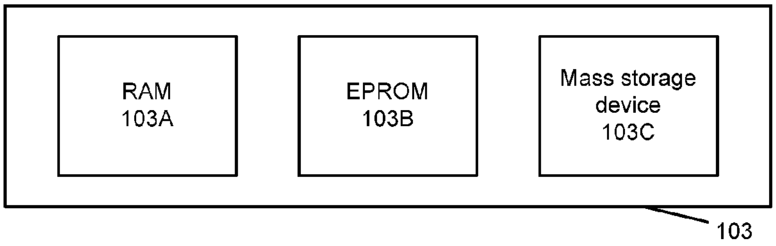
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
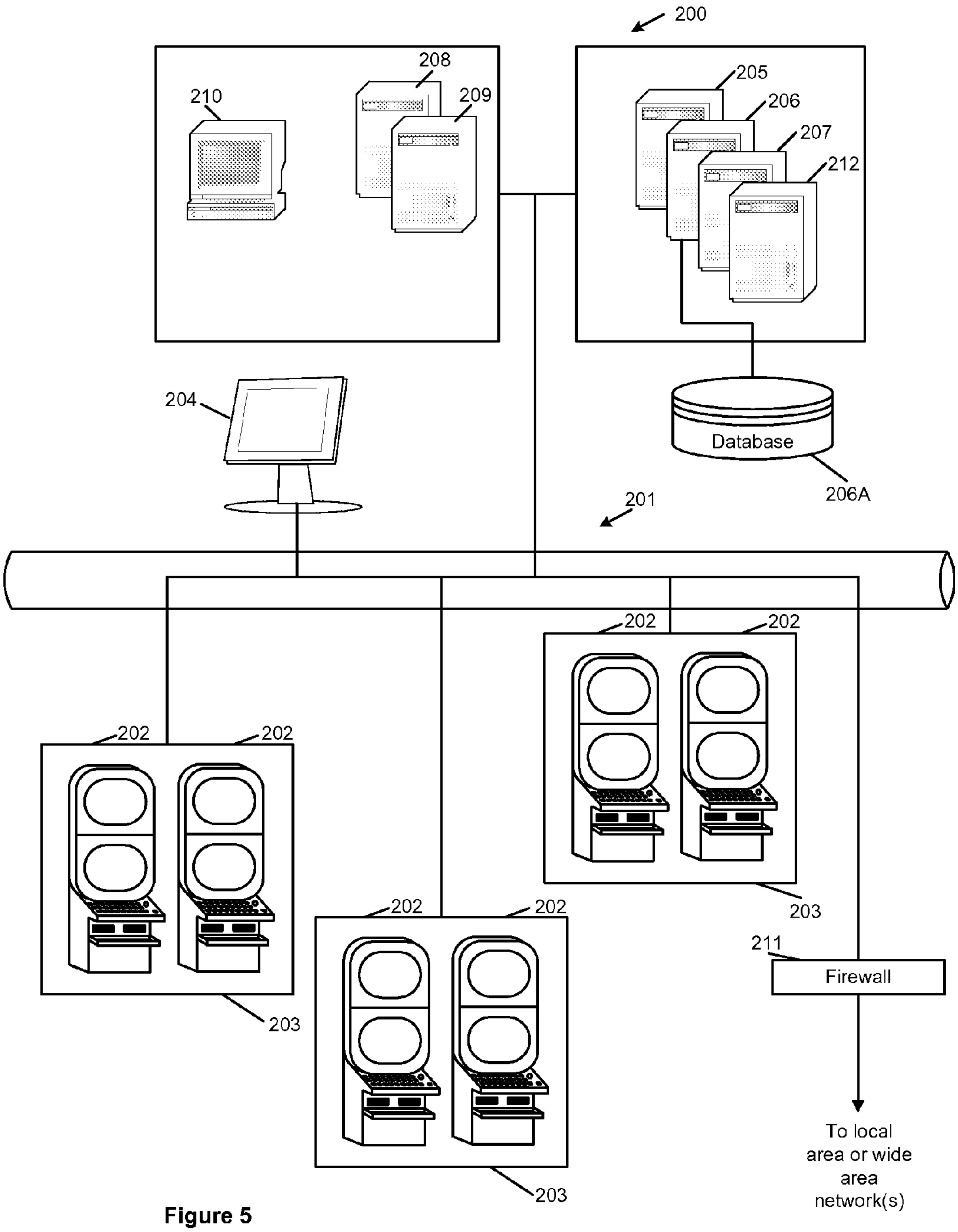
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5 are connected to the network 201. The gaming machines 202 provide a player operable interface and may be the same as the gaming machines 10,100 shown in FIGS. 2 and 3, or may have simplified functionality depending on the rules and/or guidelines for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided. Further, persons skilled in the art will appreciate that a plurality of games servers could be provided to run different games or a single game server may run a plurality of different games based on the terminals.

Embodiments of the invention relate to gaming systems for implementing games that involve a display of spinning reels as part of the display of the outcome of the game.

The game controllers of such gaming systems have a stop determining function that accesses a random number generator to determine the stop position for each reel. For example, if there are five reels, each having twenty symbols, the stop determining function might determine that the stop positions correspond to the symbols at positions 3, 13, 7, 9 and 17 of their respective reel. The spinning of the reels is then controlled so that each selected symbol comes to a stop at a designated place. The symbols shown at other display positions of each reel are automatically selected because they are on the same reel strip such that neighbouring symbols will be shown at the other display positions.

Exemplary embodiments of the present invention relate to gaming systems that allow a player to select how many win lines of a plurality of win lines they will play in each game—i.e. a minimum of one win line up to the maximum number of win lines allowed by the game. Each win line is formed by a set of symbol positions consisting of one symbol position from each reel. That is, a designated symbol position of each reel is assigned to a win line. The symbol positions that constitute each of the win lines are usually advertised to the player by markings on the display or diagrams showing the symbol positions that correspond to each win line. The win lines may incorporate for example, horizontal or incorporate diagonal line portions.

Diagonal win line portions admit the possibility that in a diagonal spin game round of the present invention, the win line can include all of the visible reel positions of a single reel, allowing for different win probabilities especially when the reel has a "stacked symbol" (i.e. a repeated set of the same symbol in adjacent positions on the reel). Diagonal win lines also allow for different interactions between the symbols of the reels and the win lines. Embodiments exploiting these possibilities are described in more detail below.

Figure 6:
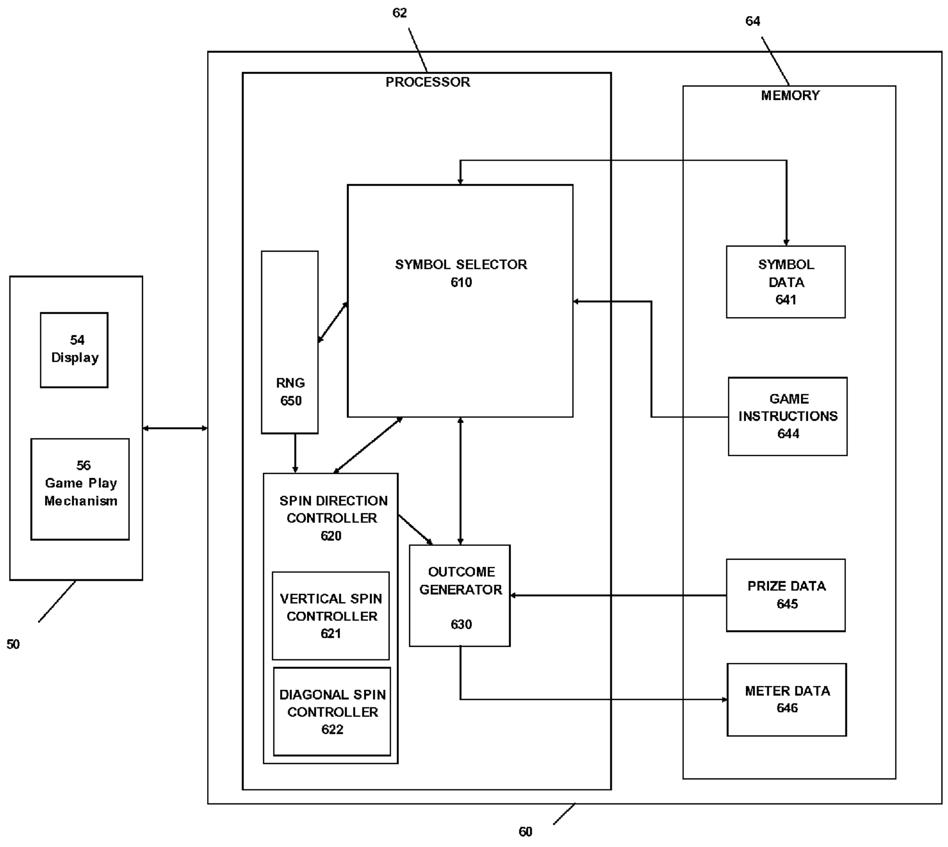
FIG. 6 is a further block diagram of the gaming system.

The game controller of one embodiment is shown in more detail in FIG. 6. The game controller 60 incorporates a processor 62 which implements a symbol selector 610, random number generator 650, spin direction controller 620 including vertical spin controller 621 and diagonal spin controller 622, and outcome generator 630 based on program code stored in memory 64. Persons skilled in the art will appreciate that one or more of these components could be provided in other ways, for example by a dedicated circuit.

Symbol selector 610 selects symbols from symbol data 641 using random numbers from random number generator 650, to appear at display positions on the display 54. For example, by selecting stop positions for a plurality of reels defined by symbol data 641 as described above. Symbol selector 610 works in cooperation with spin direction controller 620 which controls the correspondence between the reels and the display positions. In one embodiment the game round may be a conventional vertical spin game round or a diagonal spin game round, as determined in response to a trigger event which may be for example, a player input from game play mechanism 56 (for example, a specific bet type such as an ante bet), by a random event obtained either directly from random number generator 650, or by a previous game round outcome such as a special prize determined by outcome generator 630 or a specific combination of symbols. In a vertical spin game round as is conventionally played, vertical spin controller 621 informs symbol selector 610 that the visible reel positions are to correspond vertically with the reels. In a diagonal spin game round, diagonal spin controller 622 informs symbol selector 610 of a different correspondence where at least one of the reels has the visible reel positions disposed diagonally across the display positions. Which particular reel or reels are modified may be predetermined or controlled by player choice, random event or previous game outcome. Spin direction controller 620 and in particular diagonal spin controller 622 also communicates with outcome generator 630 to determine whether any win lines should be adjusted.

The outcome generator 630 calculates any prize associated with the current game round depending on game instructions 644, prize data 645 and any modifications to win lines dictated by diagonal spin controller 622. The outcome generator then updates meter data 645, and displays any win on display 54 on the player interface 50.

Figure 7:
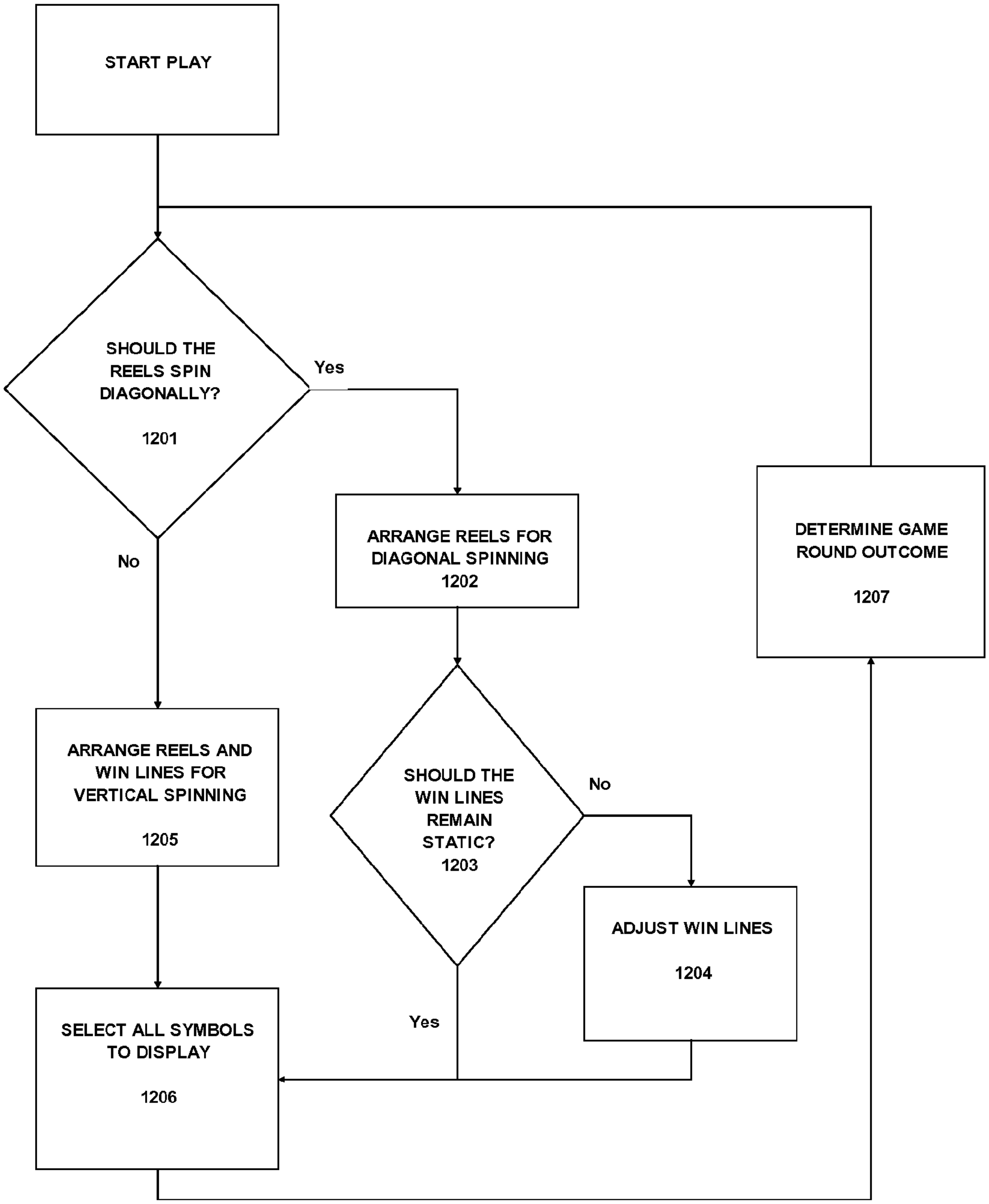
FIG. 7 shows a flow diagram for the method of an embodiment of the invention.

Now referring to FIG. 7, a flow diagram for an embodiment of the invention is shown. The step of determining whether the reels should spin diagonally 1201 is first performed, with input from player choice, random event or previous win combination. If the answer is "no", the vertical spin controller 621 informs symbols selector 610 of a particular correspondence between the display positions and the reels as well as which reels are to spin so that the reels will spin vertically. Any win line which has been adjusted in a previous diagonal spin game round is reset to its previous position. If the answer is "yes", in step 1202 the diagonal spin controller 622 informs symbol selector 610 of a particular correspondence between the display positions and the reels as well as which reels are to spin so that at least one of the reels will spin diagonally. In one embodiment, the visible reel positions of at least one of the reels is moved into a corner to accommodate other reels with diagonal spins, the former reel being frozen for the diagonal spin. In a variant of this embodiment, the reels spins but the reel is non-linear in the sense that the three display positions which correspond to the reel do not follow a straight line but these reels are still spun.

In step 1203 the diagonal spin controller determines from player choice, random event or previous win combination whether the win lines are to be adjusted. If the answer is "no", the win lines remain as the same set of display positions set during a conventional vertical spin game round. If the answer is "yes", the win lines are adjusted in step 1204. In one example, if a win line contained a diagonal element that would have allowed all the visible reel positions of a single reel to fall on the win line, the win line is rearranged to avoid such coincidence, for example, a different set of win lines may apply in diagonal spin rounds to vertical spin rounds. In another embodiment, the win lines may remain the same, for example so that a player may obtain additional benefits from stacked symbols on a reel. Accordingly, in one example, a first award made to a player is to award stacked symbols and a second award is to conduct one or more diagonal spin rounds.

In step 1206 the symbol selector 610 is cleared to spin the reels, using random number generator 650 and symbol data 641, and the result is displayed on display 54.

In step 1207 outcome generator 630 determines the game round outcome from prize data 645 using win lines as possibly modified by the spin direction controller 620.

It will be appreciated that the invention is not restricted to a particular direction of diagonal shift or a particular number of affected reels. It will also be appreciated that an alternative to rearranging the non-participating reels into corners is to overwrite those positions and even leave some positions blank or with special symbols. It will further be appreciated that the non-diagonal and non-vertical reels could also be "spun" in their crooked-leg orientations. It will also be appreciated that in one extreme, all of the game rounds can be diagonal spin game rounds.

Example 1

Figure 8A:
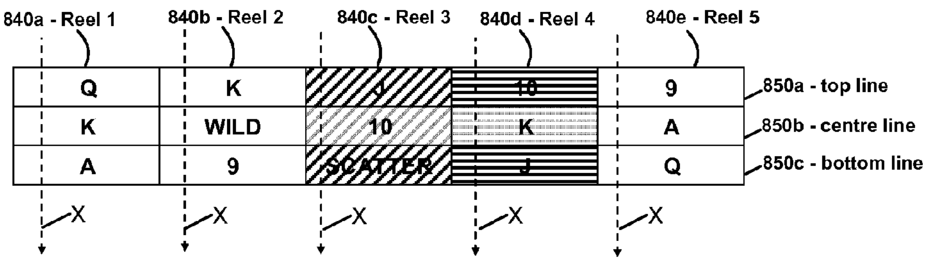
FIGS. 8A, 8B and 8C show the displays of Example 1.
Figure 8B:
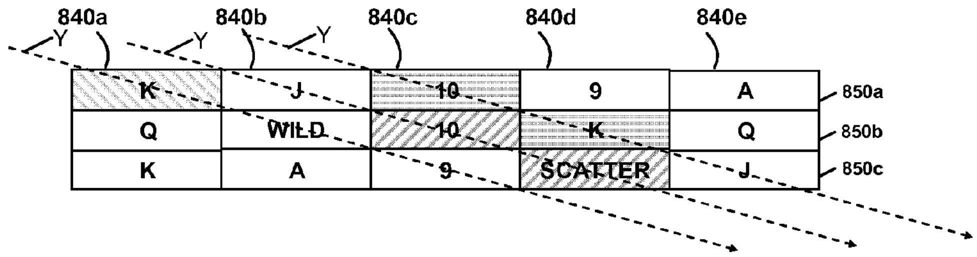
Figure 8C:
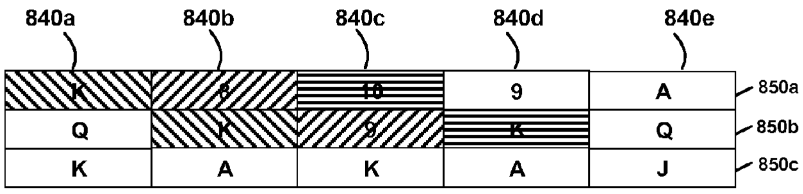

Now referring to FIGS. 8A, 8B and 8C, an example of one embodiment of the method of the invention is shown. In FIG. 8A the display is divided after a vertical spin game round into five reels 840*a* to 840*e* numbered 1 to 5 from left to right each displaying three symbols in a vertical visible reel window, arranged into top line 850*a*, centre line 850*b* and bottom line 850*c* such that there are 15 display positions in total. The spin directions in the vertical spin round were as specified by the five vertical arrows X. Triggered by a random event, the spin direction controller determines that a diagonal spin game round will now occur. The central three reels, numbers 2, 3 and 4, will be shifted to diagonal spins as indicated by arrows Y and are individually shaded in the diagram. In FIG. 8B the result of the rearrangement is seen, where reels 2, 3 and 4 are shifted horizontally one position left on the top line and horizontally one position right on the bottom line. Reel 1 is rearranged to occupy the three positions in the bottom left and reel 5 is rearranged to occupy the three positions in the top right. In FIG. 8C the result of the diagonal spin game round is shown. In this example, Reel 1 and reel 5 did not spin, being neither diagonal nor vertical. (In other embodiments they can spin with the display positions having a designated relationship such that the symbol order on the reel is preserved relative to the display positions.) Reels 2, 3 and 4 have spun diagonally. Reel 2 shows three Kings in its three display positions, having a "stacked symbol".

The prize is now evaluated by outcome generator 630. The win line in this example was the default centre line, which was not changed by diagonal spin controller 622. There are no prizes awarded, so meter data 646 is not updated.

Example 2

Figure 9:
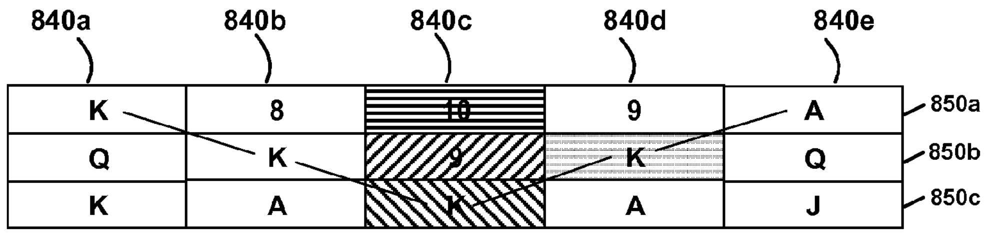
FIG. 9 shows a display of Example 2.

Now referring to FIG. 9, another example is shown as a variant on the play of example 1. The play is the same as in example 1, except that in this example the win line has been set as the zigzag line shown. Diagonal spin controller 622 has determined that the zigzag line is not to be adjusted for the diagonal spin game round. The win line passes through all of the visible reel positions of reel 2. Since Reel 2 has a stacked symbol, the consequence is that the win line picks up all the three Kings. The prize is now evaluated by outcome generator 630 and the player is paid for four Kings on the win line.

Example 3

Figure 10:
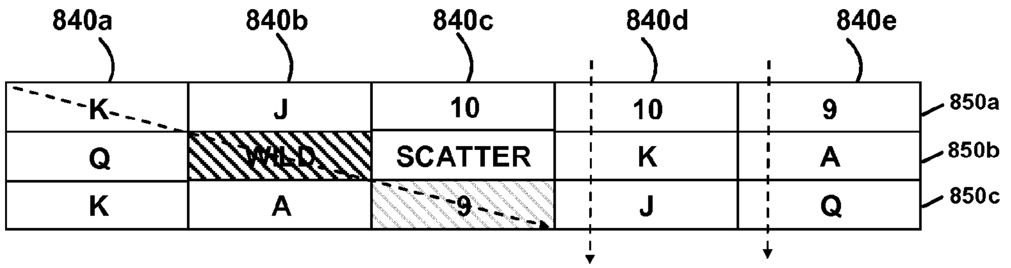
FIG. 10 shows a display of Example 3.

Now referring to FIG. 10, another example is shown as a further variant on the play of example 1. Starting from the same configuration of symbols show in FIG. 8A, diagonal spin controller 622 triggered by a random event has determined that reel 2 will be rearranged to a diagonal position. Reels 1 and 3 are shifted as shown to make way. Reels 4 and 5 are unaffected and will spin vertically. Thus in this example, reel 2 will spin diagonally, reels 4 and 5 will spin vertically and reels 1 and 3 will be frozen.

Example 4

Figure 11A:
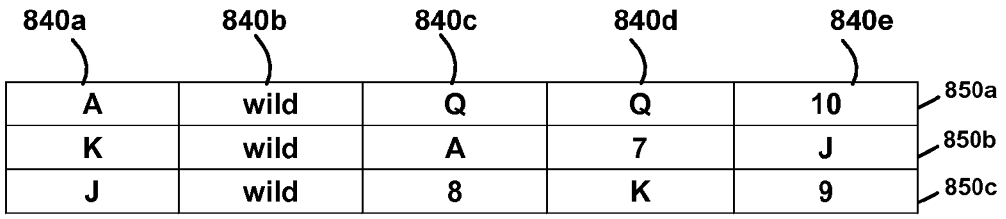
FIGS. 11A and 11B show the displays of Example 4.
Figure 11B:
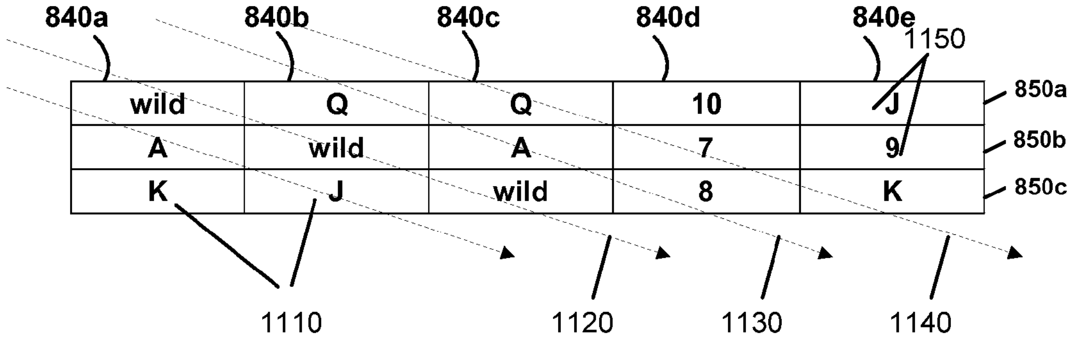

Now referring to FIGS. 11A and 11B, there is shown a further example where Reel 2 has stacked symbols in the form of a lot of wild symbols but could also be composed solely of wild symbols. In FIG. 11A there are 3 played win lines corresponding to the rows of display positions. In FIG. 11A there are now winning symbol combinations.

A diagonal spin is triggered and the reels are rearranged such that Reel 1 1110 occupies the bottom left display positions, Reels 2, 3, and 4 1120, 1130, 1140 occupy diagonal lines of display positions and Reel 5 1150 occupies the top right display positions. The reels have each been re-spun as shown in FIG. 11B such that there is a winning combination of wild, Q,Q on the top line paying 3 queens and a winning combination of A, wild, A paying 3 Aces on the centre line.

Persons skilled in the art will appreciate that the method of the embodiment could be embodied in program code. The program code could be supplied in a number of ways, for example on a computer readable medium, such as a disc or a memory (for example, that could replace part of memory 103) or as a data signal (for example, by transmitting it from a server).

Persons skilled in the art will also appreciate that many variations may be made to the invention without departing from the scope of the invention.

In the claims which follow and in the preceding description of the invention, except where the context indicates otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

It will be appreciated by persons skilled in the art that numerous variations and/or modifications may be made to the invention as shown in the specific embodiments and/or aspects without departing from the spirit or scope of the invention as broadly described. The present embodiments and aspects are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A computer-implemented method of gaming comprising:

determining, using a processor based on a random trigger event, occurrence of a diagonal spin game round, the diagonal spin game round to involve at least a subset of a plurality of available reels, each reel including a plurality of symbols, each symbol arranged at a display position on the reel, and each reel eligible to participate in a vertical spin game;

configuring, using the processor, reels participating in the diagonal spin game round such that at least one display position on each participating reel is to spin diagonally with respect to a display position on another participating reel;

facilitating, using the processor, spinning of at least the reels participating in the diagonal spin game round; and determining, using the processor, an outcome for the diagonal spin game round based on selected symbols, wherein configuring reels in the diagonal spin game round comprises shifting a top display position of at least one vertically spinning reel of the vertical spin game round horizontally in one direction and a bottom display position of the at least one vertically spinning reel of the vertical spin game round horizontally in the other direction to provide an effect of a diagonal spin.

2. A method of gaming as claimed in claim 1 further comprising controlling the correspondence of display positions to reels so that at least one game round is a vertical spin game round in which the reels are arranged to spin vertically such that they correspond to respective ones of the columns.

3. A method of gaming as claimed in claim 2 wherein at least one diagonal win line including a diagonal portion is not rearranged in a transition from the vertical spin game round to the diagonal spin game round allowing the diagonal win line to pass through multiple display positions corresponding to a diagonal reels.

4. A method of gaming as claimed in claim 2 wherein at least another one of the vertically spinning reels of the vertical spin game round is arranged into a non-spinning region in the diagonal spin game round.

5. A method of gaming as claimed in claim 2 wherein configuring reels in the diagonal spin game round comprises allowing at least one of the vertically spinning reels of the vertical spin round to remain spinning vertically.

6. A method of gaming as claimed in claim 1 wherein the vertical spin game round includes at least three vertically spinning reels and configuring reels in a diagonal spin game round comprises rearranging at least three of the vertically spinning reels of the vertical spin game round into linear diagonally spinning reels.

7. A method of gaming as claimed in claim 6 wherein the at least three of the vertically spinning reels rearranged to diagonally spinning reels in the diagonal spin game round are the three centremost reels of a set of five reels.

8. A method as claimed in claim 7, wherein there are fifteen display positions and the method comprises arranging two reels into non-linear sets of display positions comprising a corner display position and two immediately neighbouring display positions which are disposed diagonally relative to one another.

9. A gaming system comprising:

a display to display symbols in a set of display positions arranged in a plurality of rows and columns to a player;

a symbol selector to select in each game round a plurality of symbols for display, subsets of the display positions corresponding to respective ones of a plurality of reels, each reel comprising a plurality of symbols, each reel arranged to participate in a vertical spin game;

a spin direction controller to control the correspondence of display positions to reels so that at least one game round is a diagonal spin game round, the diagonal spin game round to involve at least a subset of a plurality of available reels, the spin direction controller to configure, based on a trigger event, reels participating in the diagonal spin game round such that at least one display position on each participating reel is to spin diagonally with respect to a display position on another participating reel, wherein the spin direction controller in the diagonal spin game round shifts a top display position of at least one vertically spinning reel of the vertical spin game round horizontally in one direction and shifts a bottom display position of the at least one vertically spinning reel of the vertical spin game round horizontally in the other direction to provide an effect of a diagonal spin; and an outcome generator to determine an outcome for each game round based on the selected symbols.

10. A gaming system as claimed in claim 9, wherein the spin direction controller further controls the correspondence of display positions to reels so that at least one game round is a vertical spin game round in which the reels are arranged to spin vertically such that they correspond to respective ones of the columns.

11. A gaming system as claimed in claim 10, wherein at least one diagonal win line including a diagonal portion is not rearranged in a transition from the vertical spin game round to the diagonal spin game round allowing the diagonal win line to pass through multiple display positions corresponding to a diagonal reels.

12. A gaming system as claimed in claim 10, wherein the spin direction controller arranges at least another one of the vertically spinning reels of the vertical spin game round into a non-spinning region in the diagonal spin game round.

13. A gaming system as claimed in claim 10, wherein there are fifteen display positions and the spin direction controller arranges two reels into non-linear sets of display positions comprising a corner display position and two immediately neighbouring display positions which are disposed diagonally relative to one another.

14. A gaming system as claimed in claim 9, wherein the vertical spin game round includes at least three vertically spinning reels and the spin direction controller in a diagonal spin game round rearranges at least three of the vertically spinning reels of the vertical spin game round into linear diagonally spinning reels.

15. A gaming system as claimed in claim 14, wherein the at least three of the vertically spinning reels rearranged to diagonally spinning reels in the diagonal spin game round are the three centremost reels of a set of five reels.

16. A gaming system as claimed in claim 9, wherein the spin direction controller in the diagonal spin game round allows at least one of the vertically spinning reels of the vertical spin round to remain spinning vertically.

17. A game controller comprising:

a symbol selector to select in each game round on a gaming system a plurality of symbols for display to a player in a set of display positions arranged in a plurality of rows and columns on a display, subsets of the display positions corresponding to respective ones of a plurality of reels, each reel comprising a plurality of symbols, each reel arranged to participate in a vertical spin game;

a spin direction controller to control the correspondence of display positions to reels so that at least one game round is a diagonal spin game round, the diagonal spin game round to involve at least a subset of a plurality of available reels, the spin direction controller to configure, based on a trigger event, reels participating in the diagonal spin game round such that at least one display position on each participating reel is to spin diagonally with respect to a display position on another participating reel, wherein the spin direction controller in the diagonal spin game round shifts a top display position of the at least one vertically spinning reel of the vertical spin game round horizontally in one direction and shifts a bottom display position of the at least one vertically spinning reel of the vertical spin game round horizontally in the other direction to provide an effect of a diagonal spin; and an outcome generator to determine an outcome for each game round based on the selected symbols.

18. A game controller as claimed in claim 17, wherein the processor further controls the correspondence of display positions to reels so that at least one game round is a vertical spin game round in which the reels are arranged to spin vertically such that they correspond to respective ones of the columns.

19. A game controller as claimed in claim 18, wherein at least one diagonal win line including a diagonal portion is not rearranged in a transition from the vertical spin game round to the diagonal spin game round allowing the diagonal win line to pass through multiple display positions corresponding to a diagonal reels.

20. A game controller as claimed in claim 18, wherein the spin direction controller arranges at least another one of the vertically spinning reels of the vertical spin game round into a non-spinning region in the diagonal spin game round.

21. A game controller as claimed in claim 18, wherein the spin direction controller in the diagonal spin game round allows at least one of the vertically spinning reels of the vertical spin round to remain spinning vertically.

22. A game controller as claimed in claim 17, wherein the vertical spin game round includes at least three vertically spinning reels and the spin direction controller in a diagonal spin game round rearranges at least three of the vertically spinning reels of the vertical spin game round into linear diagonally spinning reels.

23. A game controller as claimed in claim 22, wherein the at least three of the vertically spinning reels rearranged to diagonally spinning reels in the diagonal spin game round are the three centremost reels of a set of five reels.

24. A game controller as claimed in claim 22, wherein there are fifteen display positions and the spin direction controller arranges two reels into non-linear sets of display positions comprising a corner display position and two immediately neighbouring display positions which are disposed diagonally relative to one another.

25. A game controller as claimed in claim 17, wherein the spin direction controller initiates the diagonal spin game round on the basis of a trigger event.

26. A tangible computer readable storage medium including computer program code which when executed by a computer causes the computer to implement a method of gaming comprising:

determining, based on a random trigger event, occurrence of a diagonal spin game round, the diagonal spin game round to involve at least a subset of a plurality of available reels, each reel including a plurality of symbols, each symbol arranged at a display position on the reel, and each reel eligible to participate in a vertical spin game;

configuring reels participating in the diagonal spin game round such that at least one display position on each participating reel is to spin diagonally with respect to a display position on another participating reel;

facilitating spinning of at least the reels participating in the diagonal spin game round; and determining an outcome for the diagonal spin game round based on selected symbols, wherein configuring reels in the diagonal spin game round comprises shifting a top display position of at least one vertically spinning reel of the vertical spin game round horizontally in one direction and a bottom display position of the at least one vertically spinning reel of the vertical spin game round horizontally in the other direction to provide an effect of a diagonal spin.

* * * * *